E. F. CONNER.
Wagon-Body.
No 67,028.
Patented July 23, 1867.
Fig:1.
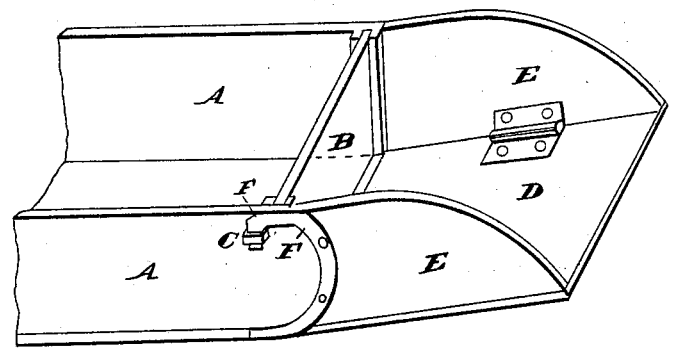
Fig:2.
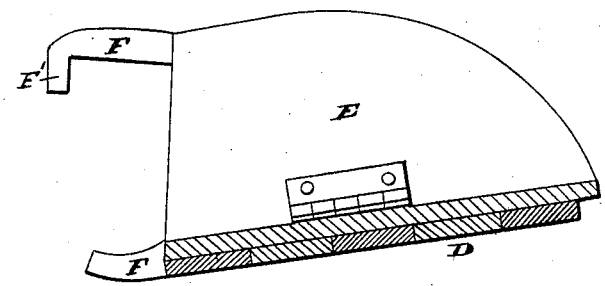
Witnesses.
D. P. Holloway
Chas. F. Clausen
Inventor.
Ezra F. Conner
by D. P. Holloway & Co.
Atty.

United States Patent Office.

EZRA F. CONNER, OF GREENSBURG, INDIANA.

Letters Patent No. 67,028, dated July 23, 1867.

IMPROVEMENT IN WAGON-BEDS.

*The Schedule referred to in these Letters Patent and making part of the same.*

TO ALL WHOM IT MAY CONCERN:

Be it known that I, EZRA F. CONNER, of Greensburg, in the county of Decatur, and State of Indiana, have invented a new and useful improvement in the Beds of Wagons; and I do hereby declare that the following is a full, clear, and exact description of the same, reference being had to the annexed drawing, making part of this specification, in which—

Figure 1 is a perspective view, and

Figure 2 is a vertical longitudinal section.

The same letters are employed in all the figures in the indication of identical parts.

My invention consists in attaching to the rear end of a wagon-bed an inclined apron with side-boards for use in unloading potatoes, apples, and analogous articles.

It is a matter of constant inconvenience in unloading potatoes, corn, fruit, coal, and other articles of a similar character, that they cannot be shovelled from the bed of the wagon without taking out the tail-board, and if the tail-board is removed a considerable quantity of the material in the hind part of the wagon will fall out upon the ground. To remedy this inconvenience I construct an adjustable tail-piece, which may, when desired, be attached to the wagon, upon the apron of which the substances will fall when the tail-board is removed, and from which they can very conveniently be shovelled.

A represents the body of an ordinary wagon, of which B is the tail-board. The adjustable tail-piece consists of an apron, D, of the same width as the body of the wagon, and the two side-boards E, which are hinged to the sides of the apron in such manner as to fold down upon the apron D. By this arrangement the tail-piece can be folded when not in use so as to occupy but very little space. To the side-board E I attach two C-formed braces, terminating at the upper end with a vertical projection, E'. A staple or socket, C, is attached to the upper hind corner of the wagon-bed to receive the hook F' and attach the tail-piece to the bed. When the tail-board B is removed the materials constituting the load and filling the bed will fall upon the apron D, and be prevented from falling upon the ground by the side-boards and apron. To prevent their rolling off, a slight ascending inclination should be given to the apron. A shovel may now be readily introduced under the material to be unloaded.

What I claim as my invention, and desire to secure by Letters Patent, is—

An adjustable extension of a wagon-bed consisting of the several parts D, E, and F, arranged to operate substantially in the manner and for the purpose set forth.

In testimony whereof I have signed my name to this specification in the presence of two subscribing witnesses.

EZRA F. CONNER.

Witnesses:
 WILL CUMBACK,
 FRANK M. WEADON.